(12) United States Patent
Hiraoka et al.

(10) Patent No.: US 11,926,184 B2
(45) Date of Patent: Mar. 12, 2024

(54) RIDING WORK VEHICLE

(71) Applicant: Kubota Corporation, Osaka (JP)

(72) Inventors: Minoru Hiraoka, Sakai (JP); Junichi Ishikawa, Sakai (JP); Shinsuke Kotani, Sakai (JP); Ryota Imanishi, Sakai (JP)

(73) Assignee: Kubota Corporation, Osaka (JP)

( * ) Notice: Subject to any disclaimer, the term of this patent is extended or adjusted under 35 U.S.C. 154(b) by 773 days.

(21) Appl. No.: 17/047,786

(22) PCT Filed: May 31, 2019

(86) PCT No.: PCT/JP2019/021760
§ 371 (c)(1),
(2) Date: Oct. 15, 2020

(87) PCT Pub. No.: WO2020/003892
PCT Pub. Date: Jan. 2, 2020

(65) Prior Publication Data
US 2021/0155066 A1 May 27, 2021

(30) Foreign Application Priority Data

Jun. 27, 2018 (JP) .................. 2018-122205
Jun. 27, 2018 (JP) .................. 2018-122206
Jun. 27, 2018 (JP) .................. 2018-122207

(51) Int. Cl.
*B60G 17/00* (2006.01)
*B60K 17/30* (2006.01)
(Continued)

(52) U.S. Cl.
CPC ......... *B60G 17/00* (2013.01); *B62D 49/0607* (2013.01); *B60K 17/30* (2013.01); *F15B 18/00* (2013.01)

(58) Field of Classification Search
CPC .... B60G 17/00; B60G 17/30; B62D 49/0607; F15B 18/00
See application file for complete search history.

(56) References Cited

U.S. PATENT DOCUMENTS 4,266,627 A * 5/1981 Lauber .................. B62D 57/00
180/8.3
5,335,739 A * 8/1994 Pieterse ............. B62D 49/0607
180/242

(Continued)

FOREIGN PATENT DOCUMENTS

CN 106005102 A 10/2016
CN 109572346 A * 4/2019

(Continued)

*Primary Examiner* — Faye M Fleming
(74) *Attorney, Agent, or Firm* — The Webb Law Firm

(57) ABSTRACT

In a riding work vehicle, power of an engine is transmitted to a traveling wheel via a horizontally oriented transmission shaft and a vertically oriented transmission shaft. The traveling wheel is supported to be changeable in direction about a rotational axis of the vertically oriented transmission shaft. Each of the vertically oriented transmission shaft and a vertically oriented transmission case is provided as an inner/outer double structure expandable/contractible in association with sliding movement thereof. The vertically oriented transmission case is supported to be pivotable together with the traveling wheel. There is provided a vehicle height adjustment mechanism capable of switching, in a plurality of steps, a relative height of the traveling wheel relative to a vehicle body frame.

9 Claims, 9 Drawing Sheets

(51) Int. Cl.
    *B62D 49/06*         (2006.01)
    *F15B 18/00*         (2006.01)

(56) References Cited

U.S. PATENT DOCUMENTS

| | | | |
|---|---|---|---|
| 7,131,651 B2 * | 11/2006 | Laursen | B60G 99/00 |
| | | | 280/124.112 |
| 8,042,817 B2 * | 10/2011 | Motebennur | B62D 49/0678 |
| | | | 280/6.154 |
| 9,227,478 B2 * | 1/2016 | Horstman | B60G 21/007 |
| 9,248,857 B2 * | 2/2016 | Spahl | B62D 9/02 |
| 2015/0290994 A1 * | 10/2015 | Dames | B60G 3/20 |
| | | | 280/830 |
| 2018/0250997 A1 | 9/2018 | Slawson et al. | |

FOREIGN PATENT DOCUMENTS

| | | | | |
|---|---|---|---|---|
| EP | 2248690 A2 | * | 11/2010 | ........... B60B 35/001 |
| FR | 2804078 A1 | * | 7/2001 | ......... B62D 49/0607 |
| JP | H0245210 A | * | 2/1990 | |
| JP | H299412 A | | 4/1990 | |
| JP | H2102813 A | | 4/1990 | |
| JP | H474106 U | | 6/1992 | |
| JP | H7195902 A | | 8/1995 | |
| JP | 200394907 A | | 4/2003 | |
| JP | 201863239 A | | 4/2018 | |
| WO | 2017040847 A1 | | 3/2017 | |

* cited by examiner

RIDING WORK VEHICLE

CROSS-REFERENCE TO RELATED APPLICATIONS

This application is the United States national phase of International Application No. PCT/JP2019/021760 filed May 31, 2019, and claims priority to Japanese Patent Application Nos. 2018-122205, 2018-122206, and 2018-122207 all filed Jun. 27, 2018, the disclosures of which are hereby incorporated by reference in their entirety.

TECHNICAL FIELD

The present invention is directed to a riding work vehicle having a plurality of traveling wheels.

BACKGROUND ART

[Background Art 1]

According to a riding work vehicle known in the art, a traveling vehicle body includes a vehicle body frame, a plurality of traveling wheels and an engine which drives the plurality of traveling wheels, power from the engine is transmitted to the traveling wheels via a horizontally oriented transmission shaft and a vertically oriented transmission shaft, and the traveling wheels are supported to be changeable in direction about a rotational axis of the vertically oriented transmission shaft relative to the vehicle body frame.

As an example of the riding work vehicle of the above-noted type, there is known one in which the vertically oriented transmission shaft and a vertically oriented case for covering this vertically oriented transmission shaft are formed long in the vertical direction, thus being designed for high clearance by securing a large ground clearance for the traveling vehicle body. The vertically oriented case has a double tubular construction comprised of an upper case portion and a lower case portion, with the upper case portion being fixed to the vehicle body frame, and the lower case portion being changeable in direction together with the traveling wheels. And the vertical length of the vertically oriented case is set to a constant length which is set in advance (see Patent Literature 1 for example).

With this configuration, in such a case where a fertilizer feeding device or a chemical spraying device is attached to a rear portion of the traveling vehicle body and there is carried out a work of feeding fertilizer or insecticide chemical to agricultural produces while the vehicle travels in a field with the right and left traveling wheels thereof striding over a ridge therebetween, thanks to the high setting of the ground clearance of the traveling vehicle body, the traveling can proceed with involving no contact between the vehicle body and the ridge formed in the field or the agricultural produces planted in the field.

[Background Art 2]

As an example of the riding work vehicle of the above-noted type, there is known one in which a traveling vehicle body includes a vehicle body frame and a plurality of traveling wheels, and the traveling wheels are supported to the vehicle body frame via a tubular support member which extends in the vertical direction.

As an example of the riding work vehicle of the above-noted type, there is known one in which the vertically oriented transmission shaft and the vertically oriented case acting as the tubular support member for covering this vertically oriented transmission shaft are formed long in the vertical direction, thus being designed for high clearance by securing a large ground clearance for the traveling vehicle body (see e.g. Patent Literature 1).

With this configuration, in such a case where a fertilizer feeding device or a chemical spraying device is attached to a rear portion of the traveling vehicle body and there is carried out a work of feeding fertilizer or insecticide chemical to agricultural produces while the vehicle travels in a field with the right and left traveling wheels thereof striding over a ridge therebetween, thanks to the high setting of the ground clearance of the traveling vehicle body, the traveling can proceed with involving no contact between the vehicle body and the ridge formed in the field or the agricultural produces planted in the field.

[Background Art 3]

A riding work vehicle which travels while carrying out a utility work in a field is sometimes provided with a stroke sensor having an expandable/contractable operation arrangement like a hydraulic cylinder in order to detect an expansion/contraction operation amount of the hydraulic cylinder when e.g. an operation of changing a ground clearance of the traveling vehicle body is effected with using the hydraulic cylinder providing a large operational force. And, as an example of such stroke sensor of the above-noted type, there is known a stroke sensor having a fixed electrode and a movable electrode both provided inside a storage case and configured to detect the expansion/contraction operation amount electrically based on a change amount occurring in an electrostatic capacitance which varies in association with an expansion/contraction movement of the hydraulic cylinder (see e.g. Patent Literature 3).

RELATED ART DOCUMENTS

Patent Literatures

Patent Literature 1: JP2003-094907A
Patent Literature 2: JP7-195902A
Patent Literature 3: JP2018-063239A

SUMMARY OF THE INVENTION

Objects to be Achieved by Invention

[Object 1]

Object relating to [Background Art 1] is as follows.

The work vehicle having the conventional configuration is capable of driving the traveling wheel via the vertically oriented transmission shaft and is capable also of smoothly changing the direction of the traveling wheel by pivoting the vertically oriented case about the axis of the vertically oriented transmission shaft. However, with the conventional configuration, since the vertical length of the vertically oriented case is fixed, i.e. constant, there would occur inconvenience that excess or shortage of ground clearance of the traveling vehicle body may occur due to e.g. a difference in the growth state of the agricultural produces, a difference in the utility work situation, etc. For instance, if the growth state of the produces is favorable, thus having a large height, an accidental contact between the vehicle body and the produces may occur if the ground clearance remains unchanged. Besides, when the work vehicle travels over a ridge in the course of its entrance to or exit from the field, if the ground clearance remains unchanged, the ground clearance of the traveling vehicle body may be so high that the posture thereof may become unstable, for instance.

Then, there has been a need for ability to set the ground clearance of the traveling vehicle body to an optimal height in accordance with such difference in the growth state of the agricultural produces, a difference in the working situation, etc., thus allowing a rotational driving and a turning operation of the traveling wheels to take place in a favorable manner.

[Object 2]

Object relating to [Background Art 2] is as follows.

With the conventional configuration described above, since the vertical length of the vertically oriented case is fixed to be constant, there would occur inconvenience that excess or shortage of ground clearance of the traveling vehicle body may occur due to e.g. a difference in the growth state of the produces, a difference in the working situation, etc. For instance, if the growth state of the produces is favorable, thus having a large height, an accidental contact between the vehicle body and the produces may occur if the ground clearance remains unchanged. Besides, when the work vehicle travels over a ridge in the course of its entrance to or exit from the field, if the ground clearance remains unchanged, the ground clearance of the traveling vehicle body may be so high that the posture thereof may become unstable, for instance.

Incidentally, as an arrangement for changing the ground clearance of the traveling vehicle body, there has been proposed an arrangement that allows change of the ground clearance of the traveling vehicle body by changing an attaching position of a wheel support case for supporting a rotational shaft of the traveling wheel to the vertically oriented transmission case as a tubular support member for supporting the traveling wheel (see e.g. Patent Literature 2). Specifically, the wheel support case is attached in such a manner that the rotational shaft of the traveling wheel is provided offset (eccentric) relative to an output shaft of the vertically oriented transmission case and the wheel support case is position-changeable by pivoting about the axis of the output shaft and then fixed in position with a bolt.

However, with such arrangement involving change of attaching position of the wheel support case, there would occur a large sliding resistance between the vertically oriented case and the wheel support case, and for coping with the risk of smooth pivotal operation of the wheel support case becoming impossible, e.g. a troublesome work of fixing with the bolt would be required. Moreover, the adjustment amount possible for change in the ground clearance of the traveling vehicle body is not sufficient, thus presenting inconvenience.

Then, there has been a need for ability to set the ground clearance of the traveling vehicle body to an optimal height in accordance with such difference in the growth state of the produces, a difference in the working situation, etc., without requiring great trouble and with smoothness.

[Object 3]

Object relating to [Background Art 3] is as follows.

With the conventional configuration described above, it is necessary to form the fixed electrode and the movable electrode within the storage case with high precision. Also, there is a need for a capacitance detecting circuit or the like for detecting an electrostatic capacitance, so that the configuration would tend to be complicated and disadvantageous in terms of cost. Moreover, since the configuration is to electrically detect an electrostatic capacitance between electrodes, if the configuration is used under a condition subject to possible intrusion of water or application of violent vibration thereto, the possibility of trouble will be high. Thus, the configuration is disadvantageous in terms of durability in case it is used in a work vehicle for outdoor use.

Then, there has been a need for ability to detect an expansion/contraction operation amount of a hydraulic cylinder at low cost and with superior durability even in the case of outdoor use.

Solutions

[Solution 1]

A solution corresponding to [Object 1] is as below.

A riding work vehicle comprising:

a traveling vehicle body;

a vehicle body frame included in the traveling vehicle frame and configured to support a vehicle body side case;

a plurality of traveling wheels supported to the vehicle body frame to be changeable in direction about a rotational axis of a vertically oriented transmission shaft;

an engine provided in the traveling vehicle body for driving the respective traveling wheels with power transmitted via the vertically oriented transmission shaft;

a vertically oriented transmission case configured to cover the circumference of the vertically oriented transmission shaft;

each of the vertically oriented transmission shaft and the vertically oriented transmission case is provided as an inner/outer double structure which is expandable/contractible while sliding in a direction of an axis of the vertically oriented transmission shaft;

the vertically oriented transmission case being supported to the vehicle body side case to be pivotable together with the traveling wheels about the rotational axis of the vertically oriented transmission shaft; and a vehicle height adjustment mechanism capable of switching a relative height of the traveling wheels relative to the vehicle body frame in a plurality of steps by expanding/contracting the vertically oriented transmission shaft and the vertically oriented transmission case in the direction of the axis of the vertically oriented transmission shaft.

With the above-described configuration, with an operation of the vehicle height adjustment mechanism, the vertically oriented transmission shaft and the vertically oriented transmission case respectively expand or contract slidably. With this, the relative height of the traveling wheel relative to the vehicle body frame can be changed and adjusted. And, with such height adjustment of the respective one of the plurality of traveling wheels, the ground clearance of the traveling vehicle body can be changed.

Thus, with the above-described arrangement of slidable contraction/expansion of the vertically oriented transmission case and the vertically oriented transmission case respectively, in comparison with e.g. an arrangement of supporting the traveling wheels with allowing elevation and lowering thereof via use of e.g. a refractive link or the like, although the arrangement does not protrude significantly to the lateral outer side and has a compact shape as seen in a plan view, the arrangement yet allows long setting for the adjustable amount of the vehicle height.

Further, since the vertically oriented transmission case is pivotable together with the traveling wheels, with whatever position the ground clearance of the traveling vehicle body may be changed to, the direction (orientation) of the traveling wheels can be changed smoothly by pivoting the vertically oriented transmission case. Moreover, transmission of rotational power to the traveling wheels is possible even when the vertically oriented transmission shaft is expanded/contracted.

Therefore, it has become possible to set the ground clearance of the traveling vehicle body to an optimal height in accordance with such difference in the growth state of the produces, a difference in the working situation, etc., while allowing a rotational driving and a turning operation of the traveling wheels to take place in a favorable manner.

According to one preferred embodiment, the vehicle body side case includes a support boss portion for pivotally supporting the vertically oriented transmission case; and the support boss portion extends downwards along the direction of the axis of the vertically oriented transmission shaft on a radial inner side of the vertically oriented transmission case.

With the above-described arrangement, with the support boss portion provided in the vehicle body side case, the vertically oriented transmission case is pivotally supported. Since the support boss portion is provided to extend downwards along the direction of the axis of the vertically oriented transmission shaft on a radial inner side of the vertically oriented transmission case, it is possible to allow the traveling wheels to support the vehicle body in a stable manner with effective prevention of reduction in the supporting strength for the vertically oriented transmission case due to the expandable/contractible arrangement and to allow a turning operation of the traveling wheels to proceed in a favorable manner.

According to one preferred embodiment:
the vehicle height adjustment mechanism includes a plurality of hydraulic cylinders extending along the direction of the axis of the vertically oriented transmission shaft and a base member for supporting the plurality of hydraulic cylinders;
the vertically oriented transmission case is provided as an inner/outer double structure that can be expanded/contracted in association with mutual sliding between an inner tubular member and an outer tubular member thereof; and
when the vertically oriented transmission case is expanded maximally, an outer circumferential side of an overlap portion where the inner tubular member and the outer tubular member are overlapped with each other is supported by the base member.

With the above-described arrangement, the vertically oriented transmission case, is provided as a structure which expands/contracts in association with mutual sliding between the inner tubular member and the outer tubular member thereof in order to constitute an expandable/contractible structure. Further, since the vehicle height adjustment mechanism includes a plurality of hydraulic cylinders that extend along the axial direction, the expanding/contracting operation of the vertically oriented transmission case can be made smoothly without risk of twisting or the like.

The vertically oriented transmission case, when expanded, presents a reduced width along the expanding/contracting direction at its overlap portion where the inner tubular member and the outer tubular member are overlapped with each other. This may present a risk of reduction in the strength in supporting the traveling wheels due to reduction in the rigidity. However, with use of the base member included in the vehicle height adjustment mechanism to support the outer circumferential side of the overlap portion of the vertically oriented transmission case, such reduction in the rigidity can be effectively prevented.

Therefore, with effective utilization of the base member required for supporting the plurality of hydraulic cylinders in the vehicle height adjustment mechanism, it has become possible to support the traveling wheels in a stable manner with prevention of reduction in the supporting strength of the vertically oriented transmission case.

[Solution 2]
A solution corresponding to [Object 2] is as below.
A riding work vehicle comprising:
a traveling vehicle body;
a vehicle body frame;
a plurality of traveling wheels; and
a tubular support member for supporting the traveling wheels to the vehicle body frame, the support member being expandable/contractible in a vertical direction;
wherein there is provided a hydraulic operation type vehicle height adjustment mechanism capable of switching, in a plurality of steps, a relative height of the traveling wheels relative to the vehicle body frame by expanding/contracting the support member;
the vehicle height adjustment mechanism includes a plurality of hydraulic cylinders that can be expanded/contracted along an expanding/contracting direction of the support member; and
the plurality of hydraulic cylinders are arranged in opposition to each other across the support member therebetween, on an outer circumferential side of the support member.

With the above-described arrangement, when the support member is expanded/contracted in the vertical direction by the vehicle height adjustment mechanism having a plurality of hydraulic cylinders, the relative position of the traveling wheels relative to the vehicle body frame can be changed in a plurality of steps. As the plurality of hydraulic cylinders are arranged at positions differing in the circumferential direction and in opposition to each other across the support member therebetween, on an outer circumferential side of the support member, the support member receives operational forces from the plurality of hydraulic cylinders uniformly, so that the support member can be expanded/contracted in a smooth manner without such disadvantage of being twisted with application of unbalanced load thereto. Moreover, e.g. a manual coupling operation for position fixing is not required as this can be coped with expansion/contraction of the hydraulic cylinders, so that no great trouble is required.

Thus, it has become possible to set the ground clearance of the traveling vehicle body to an optimal height in accordance with such difference in the growth state of the produces, a difference in the working situation, etc., without requiring great trouble and with smoothness.

According to one preferred embodiment:
the vehicle height adjustment mechanism includes a base member which is located at a vertically intermediate portion of the support member for supporting the plurality of hydraulic cylinders;
each said hydraulic cylinder includes an upper hydraulic cylinder expandable upwards relative to the base member and a lower hydraulic cylinder expandable downwards relative to the base member; and
the upper hydraulic cylinder and the lower hydraulic cylinder are disposed at different positions with respect to the circumferential direction of the support member.

With the above-described arrangement, in operation of the vehicle height adjustment mechanism, when the upper hydraulic cylinder is expanded/contracted, the area upwardly of the base member is expanded/contracted. Whereas, when the lower hydraulic cylinder is expanded/contracted, the area downwardly of the base member is expanded/contracted. When both the upper hydraulic cylinder and the lower hydraulic cylinder are expanded, the vehicle height adjustment mechanism can be switched to a maximal length state elongate in the vertical direction. When both the upper hydraulic cylinder and the lower hydraulic cylinder are contracted, the vehicle height adjustment mechanism can be switched to a minimal length state short in the vertical direction. And, when either one of the upper hydraulic cylinder and the lower hydraulic cylinder is expanded and the other thereof is contracted, the vehicle height adjustment mechanism can be switched to an intermediate length state located between the maximal length state and the minimal length state.

With the above-described arrangement, although each hydraulic cylinder employed can be a compact one having a short expansion/contraction amount (stroke), the expansion/contraction amount of the vehicle height adjustment mechanism as a whole can be made long (large). Moreover, by making selection between a state of feeding work oil to a maximal state and a state of discharging the work oil, for the plurality of hydraulic cylinders, with a simple oil pressure feeding arrangement of switching over between the state of feeding the work oil and the state of discharging the work oil, without effecting any special position control, the vehicle height adjustment mechanism can be switched in the three stages of the minimal length state, the intermediate length state and the maximal length state.

According to one preferred embodiment:

the vehicle height adjustment mechanism includes a communication oil passage which connects an oil chamber of the upper hydraulic cylinder to an oil chamber of the lower hydraulic cylinder;

the vehicle height adjustment mechanism is configured to be switchable between a sequential operation mode and a simultaneous operation mode;

when the communication oil passage has been switched to a closed state, the vehicle height adjustment mechanism, under the sequential operation mode, feeds the work oil to the oil chamber of the upper hydraulic cylinder to expand this upper hydraulic cylinder and then switches the communication oil passage to an opened state to feed the work oil to the oil chamber of the lower hydraulic cylinder; and when the communication oil passage has been switched to the opened state, the vehicle height adjustment mechanism, under the simultaneous operation mode, feeds the work oil simultaneously to the oil chamber of the upper hydraulic cylinder and the oil chamber of the lower hydraulic cylinder.

With the above-described arrangement, when the work oil is fed from a work oil supply source to the upper hydraulic cylinder, the work oil can be fed via the communication oil passage not only to the upper hydraulic cylinder, but also to the lower hydraulic cylinder. And, by switching over between the opened state and the closed state of the communication oil passage, the upper hydraulic cylinder and the lower hydraulic cylinder can be operated sequentially or the upper hydraulic cylinder and the lower hydraulic cylinder can be operated simultaneously, etc. In this way, various uses are possible depending on a difference in the work situation, so that there is achieved greater convenience.

According to one preferred embodiment, the communication oil passage is formed to extend through the inside of the base member.

With the above-described arrangement, as the communication oil passage is formed inside the base member, there is no need for any special oil pipe which takes a roundabout route on the outside. Thus, the vehicle height adjustment mechanism can be operated in a favorable manner without such disadvantage of the expanding/contracting operation being blocked by a pipe or the like, or durability of the pipe being reduced, etc.

[Solution 3]

A solution corresponding to [Object 3] is as below.

A riding work vehicle comprising:
a traveling vehicle body;
a vehicle body frame;
a traveling wheel supported to the traveling vehicle body, with relative height thereof relative to the vehicle body frame being changeable;
a hydraulic cylinder configured to be capable of switching over the relative height of the traveling wheel relative to the vehicle body frame;
an operation amount detecting means for detecting an expansion/contraction operation amount of the hydraulic cylinder; and
a first member and a second member which move relative to each other in association with expansion/contraction of the hydraulic cylinder;
  wherein the operation amount detecting means includes:
  a screw shaft configured to be movable together with one of the first member and the second member, the screw shaft having a helical blade on an outer circumferential portion thereof;
  a sliding contact member provided in the other of the first member and the second member, the sliding contact member coming into sliding contact with the helical blade in association with relative movement between the first member and the second member, thereby to rotatably guide the screw shaft; and
  a rotation detection sensor configured to be capable of detecting a rotational count of the screw shaft; and
  wherein the expansion/contraction operation amount of the hydraulic cylinder is detected based on the rotational count detected by the rotation detection sensor.

With the above-described arrangement, when the hydraulic cylinder is expanded/contracted, the first member and the second member move relative to each other in correspondence therewith and the sliding contact member provided in the other one of the first member and the second member comes into sliding contact with the helical blade of the screw shaft provided in the one member, thereby to rotate the screw shaft. And, as the rotation detection sensor detects the rotational count of the screw shaft, and based on this rotational count, the expansion/contraction operation amount of the hydraulic cylinder is detected. Such rotational count of the screw shaft has a value which corresponds to the amount of the relative movement between the first member and the second member. As such rotation detection sensor, it is possible to employ e.g. an electromagnetic pickup sensor or the like widely used for detection of rotation of a transmission shaft in e.g. an agricultural work vehicle and having high reliability.

In this way, since the arrangement detects an expansion/contraction operation amount based on the rotational count of a screw shaft obtained via a mechanical sliding contact action between the screw shaft and the sliding contact member, even a simple arrangement will suffice for the purpose, so that cost reduction is made possible. Moreover, even if water should enter from the outside, the arrangement would be hardly affected by the water, thus being superior in the durability.

Accordingly, it has become possible to detect an expansion/contraction operation amount of a hydraulic cylinder at low cost and with superior durability even in outdoor use.

According to one preferred embodiment:

there is provided a tubular sliding member having an outer tube as the first member and an inner tube as the second member slidably engaged within the outer tube;

inside the tubular sliding member, there is formed a closed space as end portions of the outer tube and the inner tube exposed to the outside are closed; and the operation amount detecting means is accommodated in the inside of the tubular sliding member.

With the above-described arrangement, since the operation amount detecting means is accommodated in the inside of the hydraulic cylinder whose circumference is covered, it is possible to prevent rainwater, muddy water or the like from coming or falling onto the operation amount detecting means, so that the durability can be further improved.

According to one preferred embodiment:

the operation amount detecting means is accommodated in the inside of the hydraulic cylinder;

a cylinder tube of the hydraulic cylinder functions as the first member; and a piston rod of the hydraulic cylinder functions as the second member.

With the above-described arrangement, since the hydraulic cylinder is provided with the cylinder tube and the piston rod which move relative to each other in association with an expanding/contracting operation, the operation amount detecting means is accommodated in the inside of the hydraulic cylinder to directly detect the amount of relative movement between the cylinder tube and the piston rod. Therefore, the detection of the expansion/contraction operation amount is made possible with effective utilization of a member provided originally in the hydraulic cylinder.

Further and other characterizing features and advantages resulting therefrom will become apparent upon reading the following detailed description.

EMBODIMENTS OF THE INVENTION

Embodiments of a riding work vehicle according to the present invention will be described with reference to the drawings.

[General Configuration]

Figure 1:
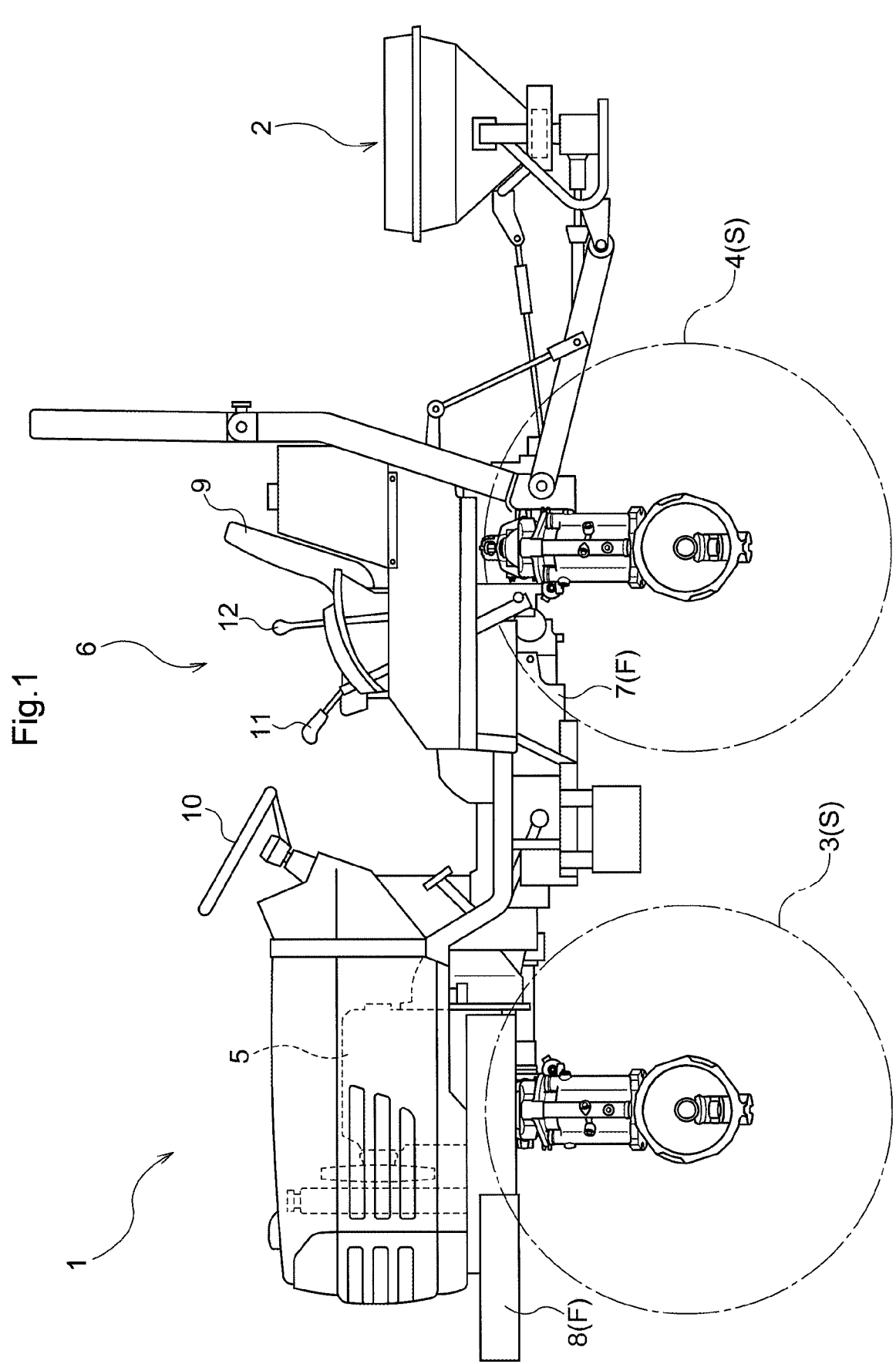
FIG. 1 is an overall side view of a work vehicle.

FIG. 1 shows a riding work vehicle according to the present invention. The work vehicle includes, at a rear portion of a four-wheel traveling type traveling vehicle body 1, a chemical agent spraying device 2 as an implement (utility implement). The work vehicle is configured to carry out a utility work of spraying chemical agent onto agricultural produces while traveling across a planting row of the produces, in a field where such produces are planted in advance.

On the right and left sides of the front portion of the traveling vehicle body 1, there are provided a pair of front wheels 3 as "traveling wheels S" capable of turning, and on the right and left sides of the rear portion of the traveling vehicle body 1, there are provided a pair of rear wheels 4 as the "traveling wheels S" capable of turning. In this way, all of the four wheels can effect turning (i.e. being steerable). So that, it is possible to switch over e.g. between a two-wheel steering state in which only the two front wheels 3 are steered and a four-wheel steering state in which the front wheels 3 and the rear wheels 4 are steered in the opposite directions from each other, to make a turn with a small turning radius.

The front wheels 3 and the rear wheels 4 are formed with narrow width so as to allow traveling between ridges which are located between planting rows. At a front portion of the traveling vehicle body 1, an engine 5 is mounted and at a rear portion of the traveling vehicle body 1, a driving section 6 is provided. Downwardly of the traveling vehicle body 1, there is provided a transmission case 7 accommodating an unillustrated speed changer mechanism for changing the speed of power from the engine 5. The transmission case 7 is provided to extend in the front/rear direction from a rear lower part of the engine 5 to a position corresponding to the rear wheels 4 as seen in the side view. On the lower side of the engine 5, a front side frame body 8 is provided to cover the outer circumferential portion thereof. The transmission case 7 and the font side frame body 8 are connected integrally to each other, thereby to constitute a vehicle body frame F which supports the entire vehicle body. The driving section 6 includes a driver's seat 9 at which a driver is seated and a steering wheel 10 disposed forwardly of the driver's seat 9 for effecting a steering operation. The driving section 6 further includes a lift lever 11 for lifting the implement up/down, a speed changer lever 12 and so on.

Figure 2:
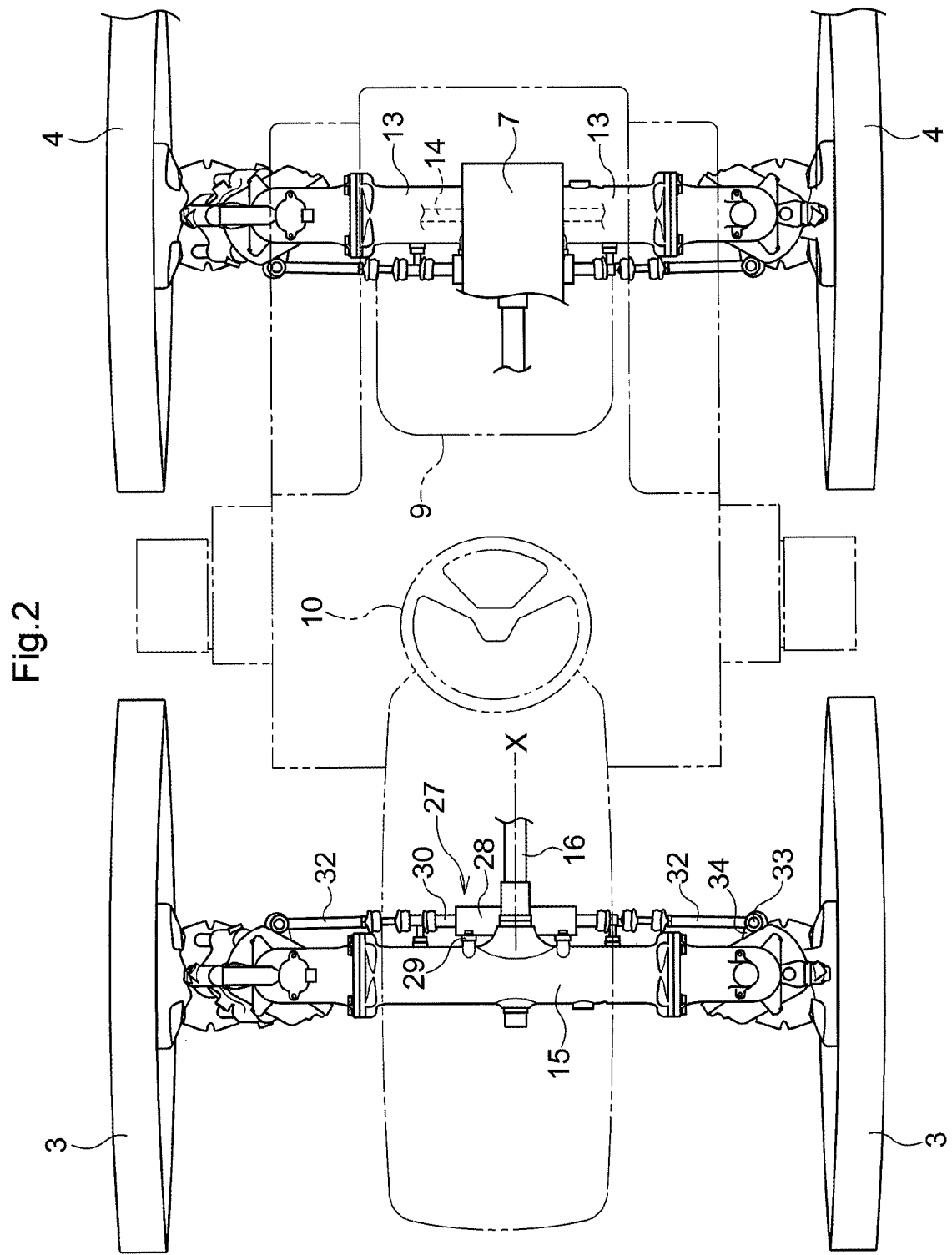
FIG. 2 is a plan view showing a wheel supporting structure of the work vehicle.

In the traveling vehicle body 1, power from the engine 5 is speed-changed by the speed changer device provided inside the transmission case 7 and then transmitted to the right and left front wheels 3 and the right and left rear wheels 4. Whereby, the traveling vehicle body 1 is configured as a four-wheel drive type having four traveling wheels S being driven. As shown in FIG. 2, inside a tubular, rear horizontally oriented transmission case 13 (one example of "vehicle body side case") connected to the right and left opposed sides of the transmission case 7, there is provided a horizontally oriented transmission shaft 14, so that speed-changed power is transmitted to the right and left rear wheels 4 via the horizontally oriented transmission shaft 14. The rear horizontally oriented transmission case 13 is supported to the transmission case 7, namely, to the vehicle body frame F.

As shown in FIG. 2, at a right/left intermediate portion of the right and left front wheels 3, there is provided a tubular, front horizontally oriented transmission case 15 (an example of the "vehicle body side case", to be referred to also simply as "horizontally oriented transmission case 15" hereinafter), so that the power from the transmission case 7 is transmitted to the right and left front wheels 3 via a front/rear oriented intermediate shaft 16, a differential mechanism (not shown) provided inside the horizontally oriented transmission case 15 and a horizontally oriented transmission shaft 18. The front horizontally oriented transmission case 15 is supported to the vehicle body frame F to be capable of rolling about a front/rear axis X extending concentric with the intermediate shaft 16.

Figure 3:
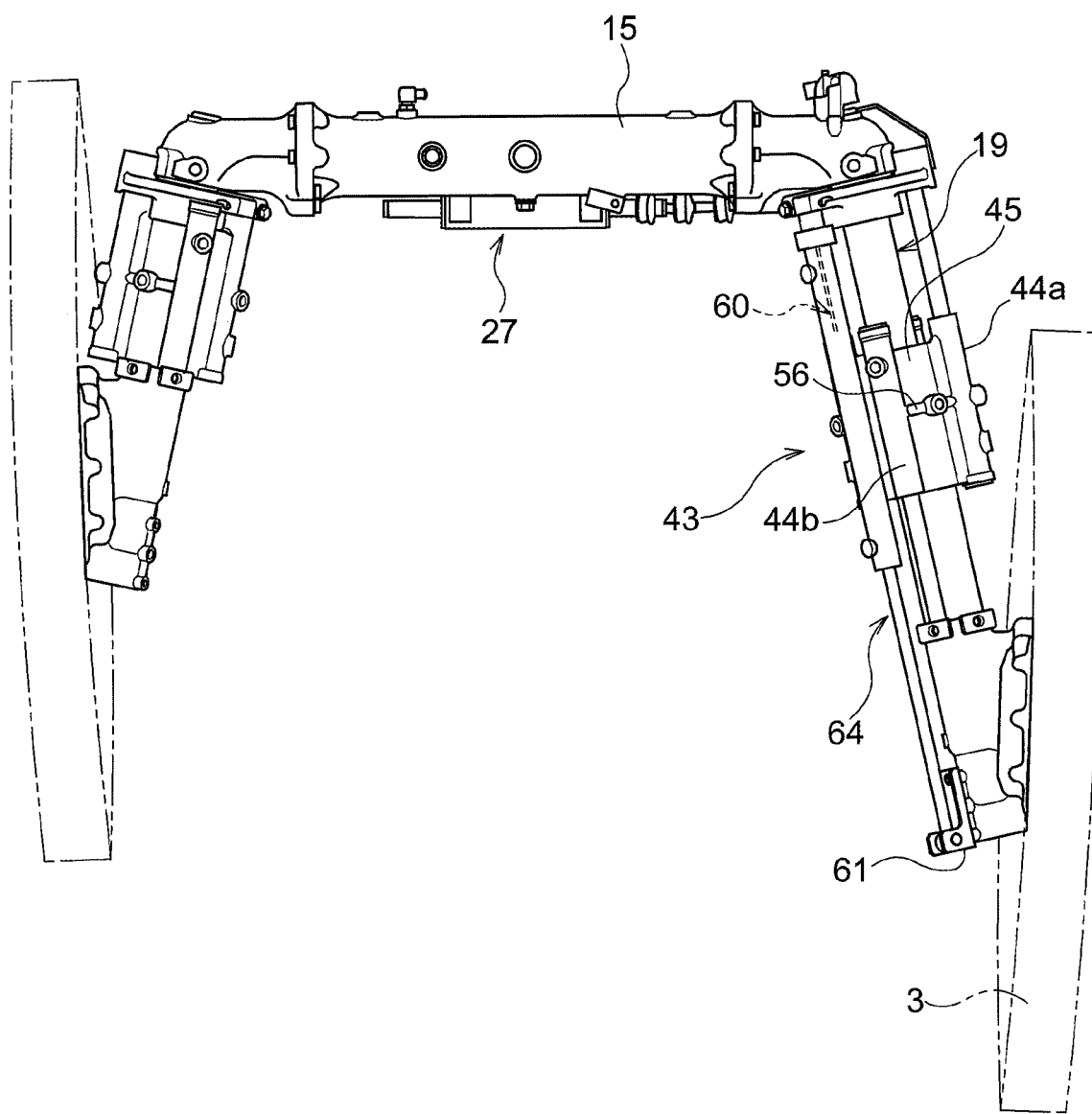
FIG. 3 is a front view showing the wheel supporting structure.
Figure 7:
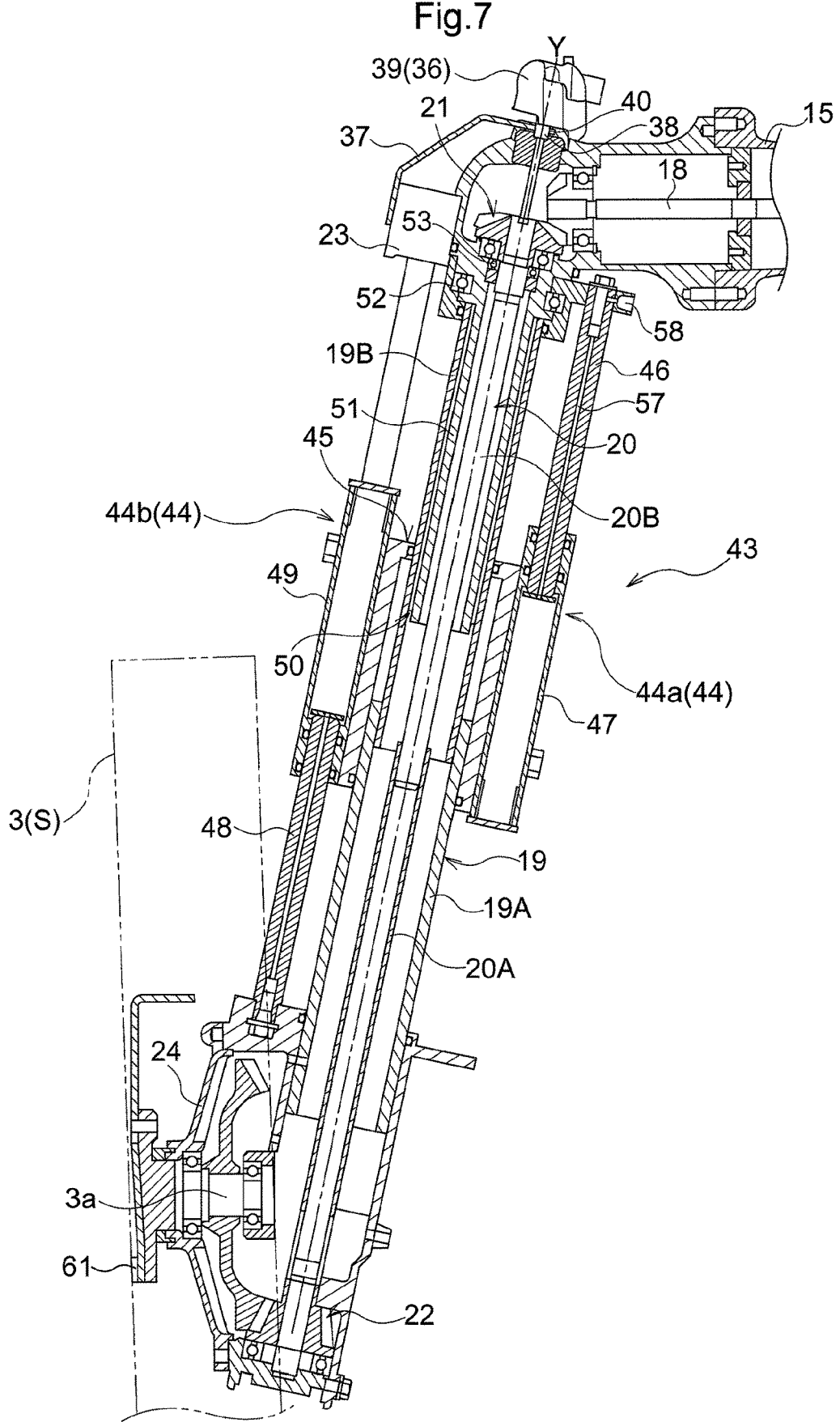
FIG. 7 is a front view in horizontal section showing a vehicle height adjustment mechanism under its maximally expanded state.

As shown in FIG. 3, to the right/left end portions of the front horizontally oriented transmission case 15, vertically oriented transmission cases 19 are connected (each acting as an example of a "support member"). As shown in FIG. 7, inside each vertically oriented transmission case 19, there is provided a vertically oriented transmission shaft 20. An axial end portion of the horizontally oriented transmission shaft 18 in the front horizontally oriented transmission case 15 is operably coupled to an upper end portion of the vertically oriented transmission shaft 20 via an upper bevel gear mechanism 21. A lower end portion of the vertically oriented transmission shaft 20 is operably coupled to a rotational shaft 3a of the front wheel 3 via a lower bevel gear mechanism 22.

And the traveling wheel S is supported to the vehicle body frame F to be direction-changeable about a rotational axis Y of the vertically oriented transmission shaft 20. Since the wheel support arrangement, including the vertically oriented transmission case 19 and the vertically oriented transmission shaft 20, has an identical construction for each one of the four traveling wheels S, the support arrangement only for one front wheel 3 as one of them will be described next.

[Wheel Support Arrangement]

Figure 4:
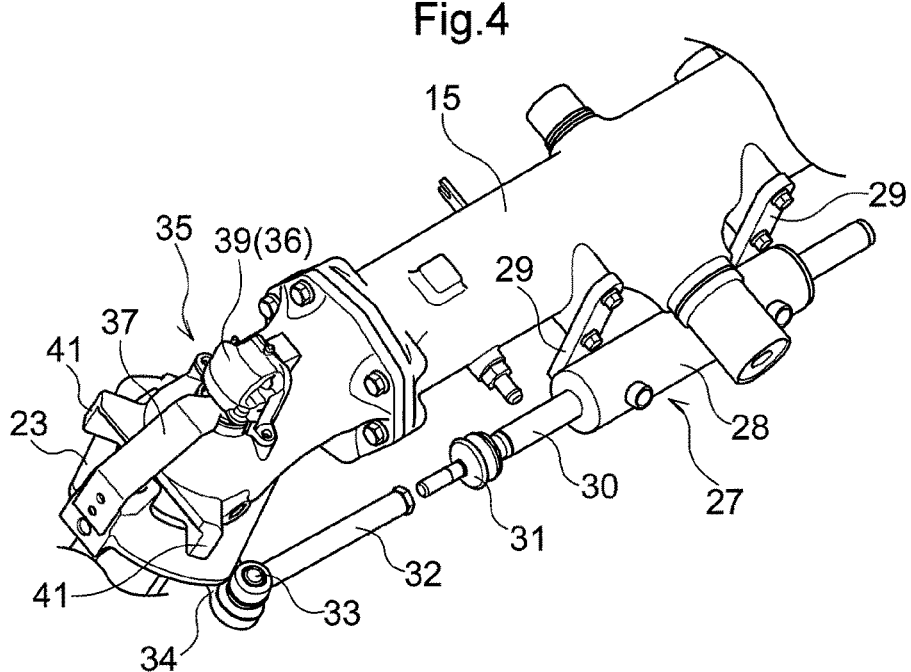
FIG. 4 is a perspective view showing a part of the wheel supporting structure.
Figure 5:
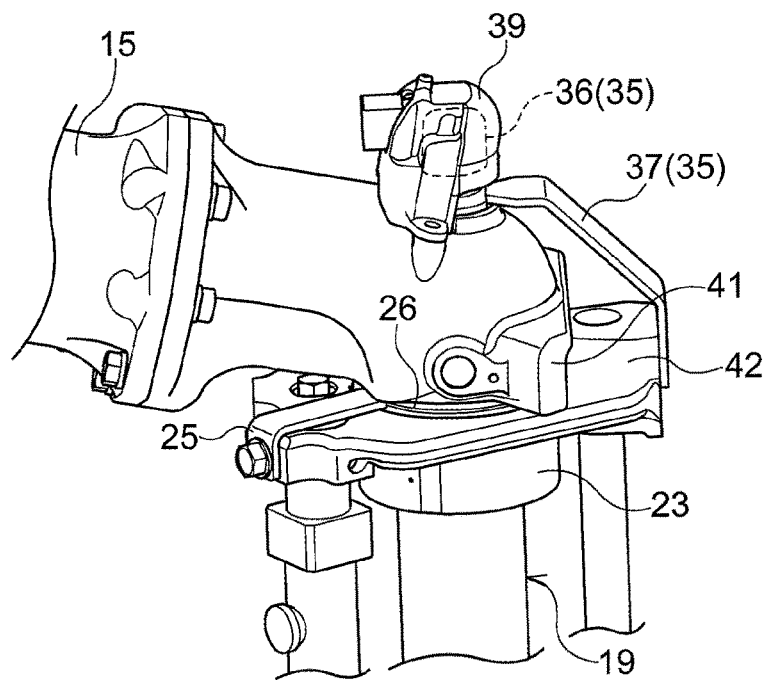
FIG. 5 is a perspective view showing another part of the wheel supporting structure.

As shown in FIGS. 4, 5 and 7, the terminal end of the front horizontally oriented transmission case 15 presents a curved bent shape as seen in a front view to cover the upper bevel gear mechanism 21 and defines an opening which opens downwards. For covering the opening, an upper connection body 23, which is connected integrally to the upper end portion of the vertically oriented transmission case 19, is engaged and connected to an end portion of the front horizontally oriented transmission case 15 to be pivotable about the rotational axis Y of the vertically oriented transmission shaft 20. As shown in FIG. 7, to the lower end portion of the vertically oriented transmission case 19, there is connected a wheel support case 24 for covering the lower bevel gear mechanism 22 and also for supporting the rotational shaft 3a of the front wheel 3.

A retainer 25 is provided for preventing inadvertent removal of the upper connection body 23 under its engaged and connected state. As shown in FIG. 5, the retainer 25 is formed of a strip member, and has one end portion thereof bolt-connected to the outer circumferential portion of the upper connection body 23, and the other end portion thereof engaged with a stepped portion 26 which is formed at the terminal end of the front horizontally oriented transmission case 15 for preventing the removal.

As shown in FIGS. 2, 3 and 4, there is provided a double-action type hydraulic cylinder 27 for steering operation (to be referred to as "steering cylinder 27" hereinafter) which is located forwardly of the front horizontally oriented transmission case 15 and under a posture parallel with the front horizontally oriented transmission case 15. And a cylinder tube 28 of the steering cylinder 27 is coupled with the front horizontally oriented transmission case 15 via a bracket 29. Further, a piston rod 30 of the steering cylinder 27 is operably coupled to one end portion of a tie rod 32 via a ball joint 31 and the other end portion of the tie rod 32 is operably coupled via a ball joint 33 with a knuckle arm 34 included in the upper connection body 23.

When the steering cylinder 27 is operated, via the knuckle arm 34 and the upper connection body 23, the vertically oriented transmission case 19, the wheel support case 24 and the front wheel 3 respectively pivot together about the rotational axis Y of the vertically oriented transmission shaft 20, whereby the direction (orientation) of the front wheel 3 is changed. In response to an operation on the steering wheel 10, the steering cylinder 27 has its hydraulic control valve switched by an unillustrated control device, thus being slid under oil pressure from a neutral position for straight traveling to the left direction or the right direction.

At an upper part of the terminal end of the front horizontally oriented transmission case 15, there is provided a pivot angle detection device 35 for detecting a pivot angle of the upper connection body 23, namely, a pivot angle of the front wheel 3. This pivot angle detection device 35 includes a potentiometer type detection device body 36 fixedly provided at the upper part of the front horizontally oriented transmission case 15, and a strip-like operational arm 37. The operational arm 37 has one end portion thereof bolt-connected to the outer circumferential portion of the upper connection body 23, and the other end portion thereof engaged and coupled with a rotational shaft 38 protruding downwards from the detection device body 36.

Figure 6:
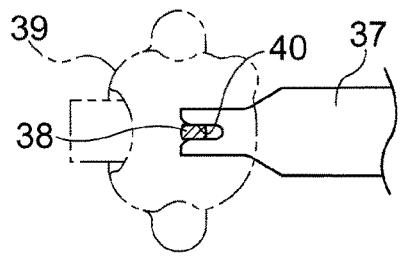
FIG. 6 is a plan view showing an engagement state of an operational arm.

As shown in FIG. 3 and FIG. 4, the detection device body 36 has its outer circumference covered by a casing 39, and the casing 39 is coupled to the upper part of the terminal end of the front horizontally oriented transmission case 15. The operational arm 37 is provided to extend obliquely upwards from its portion coupled with the upper connection body 23. As shown in FIG. 6, the rotational shaft 38 is worked to provide a rectangular shape cross section, so that the rotational shaft 38 is operatively coupled to be rotated together with the operational arm 37, through engagement with a rectangular shape engagement groove 40 formed at the other end portion of the operational arm 37.

At the terminal end of the front horizontally oriented transmission case 15, there is formed a pivot restriction portion 41 for restricting the range of pivotal operation of the upper connection body 23. On the other hand, an upper protrusion portion 42 formed in the upper connection body 23 is configured to allow the pivotal operation thereof within the range set by the pivot restriction portion 41.

In response to an operation of the steering cylinder 27, the upper connection body 23, thus the vertically oriented transmission case 19 and the front wheel 3, can be pivoted within the operational range restricted by the pivot restriction portion 41. Then, the pivot operation angle of the upper connection body 23 is detected by the pivot angle detection device 35 and fed back to the unillustrated control device, whereby the steering cylinder 27 will be controlled to provide a steering angle corresponding to the operation of the steering wheel 10.

[Vehicle Height Adjustment Mechanism]

Figure 8:
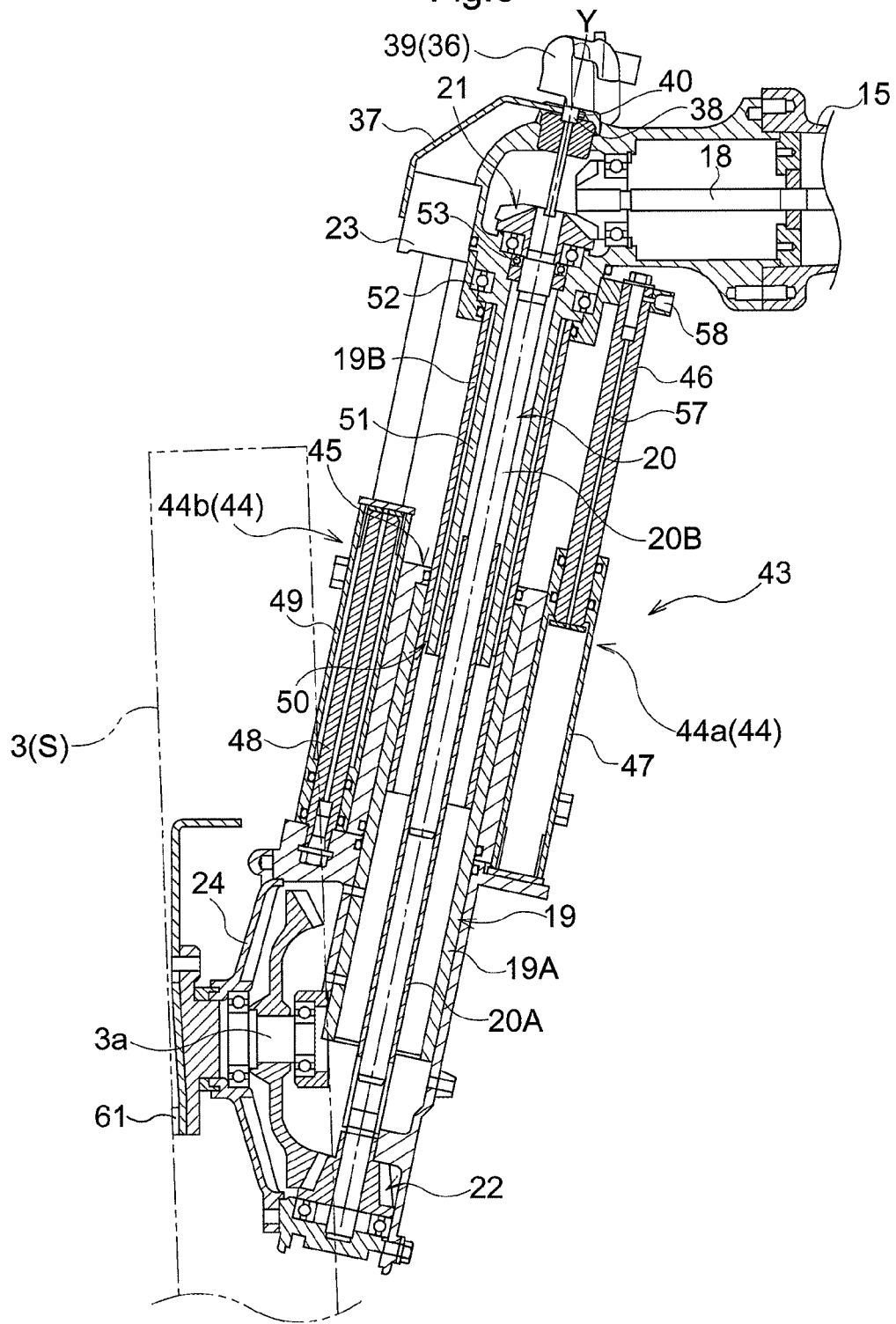
FIG. 8 is a front view in horizontal section showing the vehicle height adjustment mechanism under its intermediately expanded state.
Figure 9:
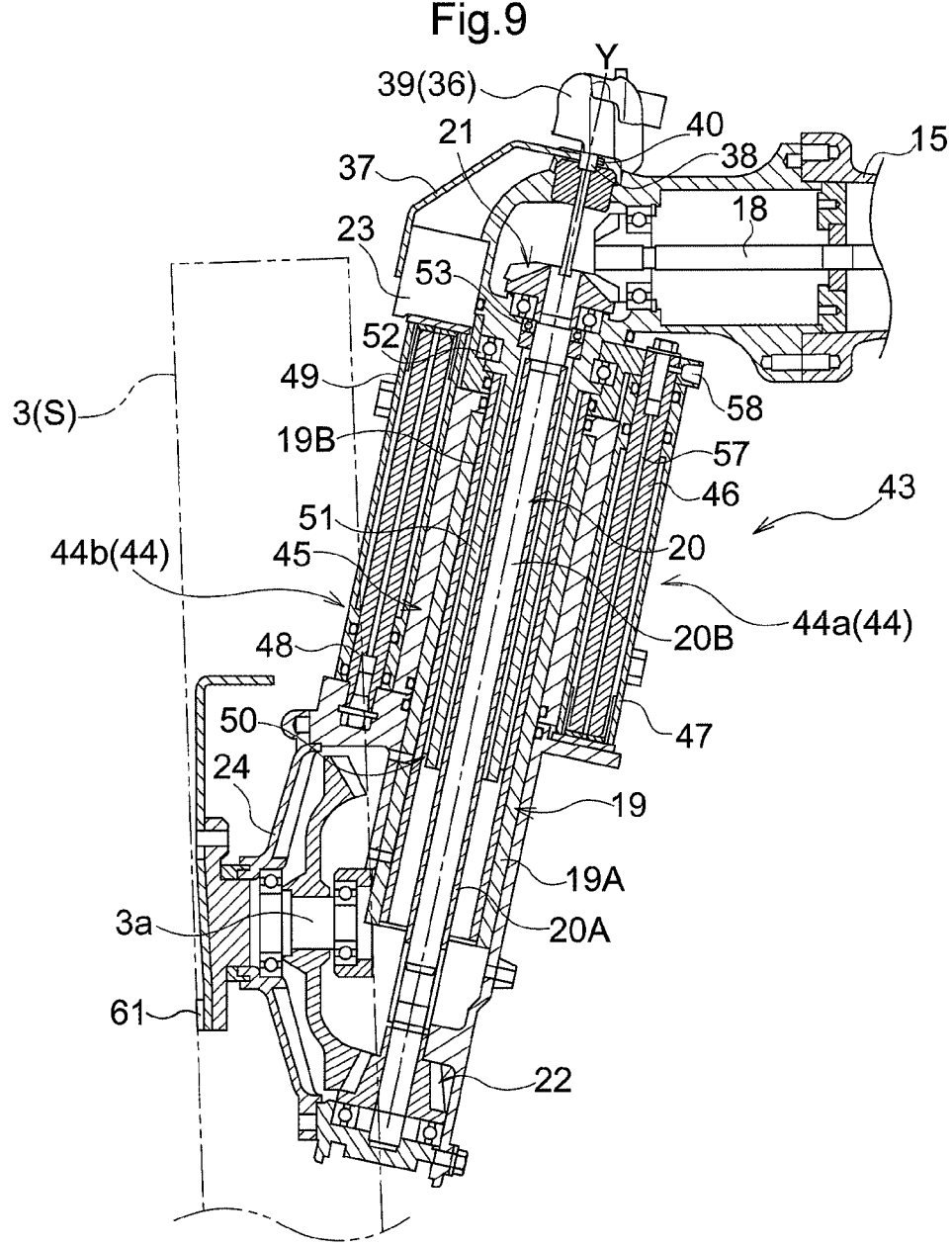
FIG. 9 is a front view in horizontal section showing the vehicle height adjustment mechanism under its shortest state.

Each of the vertically oriented transmission shaft 20 and the vertically oriented transmission case 19 is provided as an inner/outer double structure which can be expanded/contracted while sliding in the direction of the axis of the vertically oriented transmission shaft 20. As shown in FIGS. 7, 8 and 9, the vertically oriented transmission case 19 includes an outer tubular member 19A and an inner tubular member 19B, so that the case 19 is expandable/contractible in association with sliding movements of these members. The vertically oriented transmission case 19 is provided in such a manner that the outer tubular member 19A is located on the lower side and the inner tubular member 19B is located on the upper side. And the lower end portion of the outer tubular member 19A is integrally coupled with the wheel support case 24 and the upper end portion of the inner tubular member 19B is integrally coupled with the upper connection body 23.

As shown in FIGS. 7, 8 and 9, the vertically oriented transmission shaft 20 includes a tubular shaft 20A, and an inner shaft 20B which is slidable in the axis direction with maintaining a state of being spline-engaged with the inner side of the tubular shaft 20A to be rotatable therewith. An upper end portion of the inner shaft 20B is coupled with the upper bevel gear mechanism 21 to be rotatable therewith. The lower end portion of the tubular shaft 20A is coupled with the lower bevel gear mechanism 22 to be rotatable therewith.

There is provided a hydraulic operation type vehicle height adjustment mechanism 43 configured to be capable of switching the relative height of the front wheel 3 relative to the vehicle body frame F in a plurality of steps by expanding/contracting the vertically oriented transmission shaft 20 and the vertically oriented transmission case 19 in the direction of the rotational axis Y of the vertically oriented transmission shaft 20. As shown in FIGS. 3, 7, 8 and 9, the vehicle height adjustment mechanism 43 includes a plurality of hydraulic cylinders 44 which extend along the direction of the axis of the vertically oriented transmission shaft 20, and a base member 45 for supporting the plurality of hydraulic cylinders 44. The plurality of hydraulic cylinders 44 are arranged at positions which differ from each other in the circumferential direction on the outer circumference side of the vertically oriented transmission case 19 and in opposition to each other across the vertically oriented transmission case 19 therebetween.

More particularly, as the plurality of hydraulic cylinders 44, there are provided two upper hydraulic cylinders 44a which can be expanded/contracted toward the upper side relative to the base member 45, and two lower hydraulic cylinders 44b which can be expanded/contracted toward the lower side relative to the base member 45. The two upper hydraulic cylinders 44a are arranged at positions which differ from each other in the circumferential direction on the outer circumference side of the vertically oriented transmission case 19 and in opposition to each other across the vertically oriented transmission case 19 therebetween. Similarly, the two lower hydraulic cylinders 44b are arranged at positions which differ from each other in the circumferential direction on the outer circumference side of the vertically oriented transmission case 19 and in opposition to each other across the vertically oriented transmission case 19 therebetween.

Figure 10:
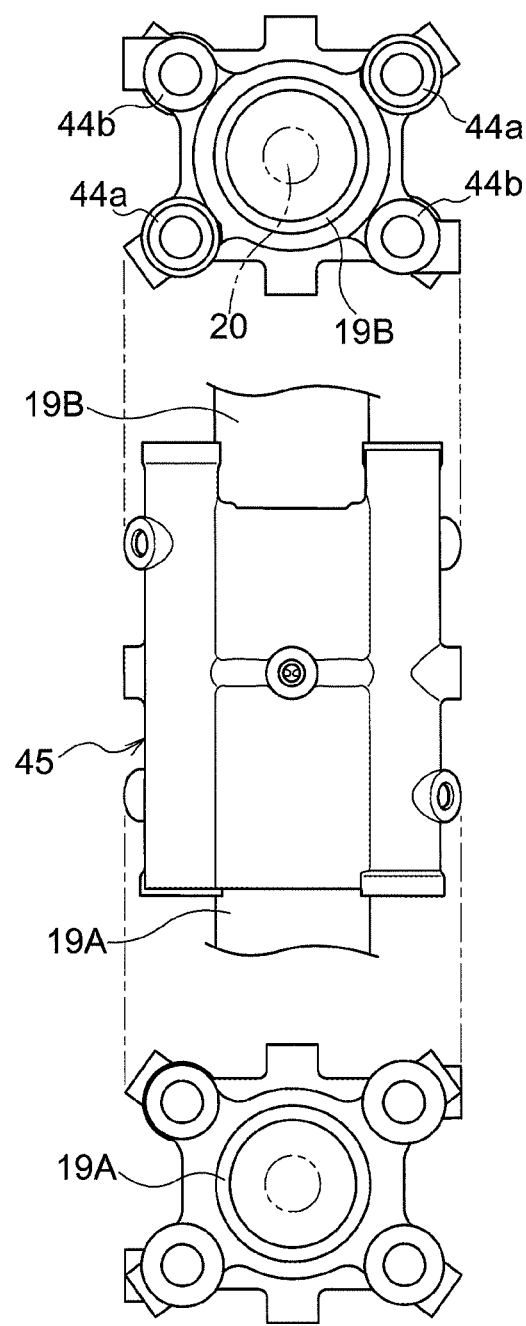
FIG. 10 is a view showing a base member.

The upper hydraulic cylinders 44a and the lower hydraulic cylinders 44b are arranged at the positions differing from each other in the circumferential direction. Namely, as shown in FIG. 10, each of the lower hydraulic cylinders 44b is disposed to be located at approximately intermediate portion in the circumferential direction of the two upper hydraulic cylinders 44a as seen in the axial direction thereof.

Each of the upper hydraulic cylinders 44a is provided with the piston rod 46 thereof being located on the upper side and the cylinder tube 47 thereof being located on the lower side. Each of the lower hydraulic cylinders 44b is provided with the piston rod 48 thereof being located on the lower side and the cylinder tube 49 thereof being located on the upper side. The leading end portions of the piston rods 46 of the two upper hydraulic cylinders 44a are integrally coupled with the upper connection body 23, and the leading end portions of the piston rods 48 of the two lower hydraulic cylinders 44b are integrally coupled with the wheel support case 24. The cylinder tubes 47 of the two upper hydraulic cylinders 44a and the cylinder tubes 49 of the two lower hydraulic cylinders 44b are integrally coupled with the base member 45. Whereby, the upper hydraulic cylinders 44a are located on the upper side relative to the base member 45 and the lower hydraulic cylinders 44b are located on the lower side relative to the base member 45.

The upper end portion of the vertically oriented transmission case 19 and the upper end portions of the two upper hydraulic cylinders 44a are integrally coupled with the upper connection body 23 and the lower end portions of the two lower hydraulic cylinders 44b are integrally coupled with the vehicle support case 24. Further, the cylinder tubes 47 of the two upper hydraulic cylinders 44a and the cylinder tubes 49 of the two lower hydraulic cylinders 44b are integrally coupled with the base member 45. Therefore, the upper connection body 23 and the wheel support case 24 are integrally coupled with each other via the four hydraulic cylinders 44 and the base member 45. So that, when the steering cylinder 27 is operated, these members are pivoted together to thereby steer the front wheel 3.

When the vertically oriented transmission case 19 is set to the maximally expanded state as shown in FIG. 7 with expanding operations of the four hydraulic cylinders 44, an outer circumferential side of an overlap portion 50, where the outer tubular member 19A and the inner tubular member 19B are overlapped with each other, is supported by the base member 45. Thus, even when the vertically oriented transmission case 19 is expanded to reduce the vertical width of the overlap portion 50, the outer circumferential side of an overlap portion 50 is supported by the base member 45, thus preventing deterioration in the supporting strength.

As shown in FIGS. 7, 8 and 9, at the terminal end of the horizontally oriented transmission case 15 to which the upper connection body 23 is pivotally connected, a support boss portion 51 for pivotally supporting the inner side of the vertically oriented transmission case 19 is provided to be located on the radially inner side of the vertically oriented transmission case 19 and to extend downwards along the direction of the rotational axis Y. Namely, at the terminal end of the horizontally oriented transmission case 15, the support boss portion 51 configured to pivotally support the inner circumferential side of the upper connection body 23 is formed to extend integrally downwards along the direction of the axis of the vertically oriented transmission shaft 20. The support boss portion 51 pivotally supports, via a bearing 53, the vertically oriented transmission shaft 20 which is located on the inner circumferential side.

The support boss portion 51 is provided to extend elongate downwards to reach the lower side than the vertical intermediate portion of the inner tubular member 19B. In this way, as the vertically elongate support boss portion 51 supports the vertically oriented transmission case 19 from the inner circumference side, reduction in the supporting strength for the vertically oriented transmission case 19 is prevented.

In the vehicle height adjustment mechanism 43, there is formed a communication oil passage 56 which extends through the inside of the base member 45 to connect an oil chamber 54 of the upper hydraulic cylinder 44a to an oil chamber 55 of the lower hydraulic cylinder 44b. And the vehicle height adjustment mechanism 43 is configured to be switchable between a "sequential operation mode" in which work oil is fed to the oil chamber 54 of the upper hydraulic cylinder 44a with switching the communication oil passage 56 to its closed state to expand the upper hydraulic cylinder 44a and then the communication oil passage 56 is switched over to its opened state for feeding work oil to the oil chamber 55 of the lower hydraulic cylinder 44b and a "simultaneous operation mode" in which, with switching the communication oil passage 56 to the opened state, the work oil is fed simultaneously to the oil chamber 54 of the upper hydraulic cylinder 44a and the oil chamber 55 of the lower hydraulic cylinder 44b.

More particularly, as shown in FIGS. 7, 8 and 9, an inner oil passage 57 is formed in the shaft inner portion of the piston rod 46 of the upper hydraulic cylinder 44a integrally coupled with the upper connection body 23. The upper connection body 23 defines a work oil feed opening 58, and the work oil feed opening 58 is communicated and connected to the inner oil passage 57. Though not shown, the work oil is fed to the work oil feed opening 58 via an oil pressure control valve from a hydraulic pump provided in the traveling vehicle body 1. Since the inner oil passage 57 is formed in the inner shaft portion of the piston rod 46 in this way, the work oil can be fed to the inside of the oil chambers with utilization of the inner oil passage 57, whereby there is no need to provide any special external piping or the like to extend from the work oil feed opening 58, so that simplification of the hydraulic piping is realized.

Figure 11:
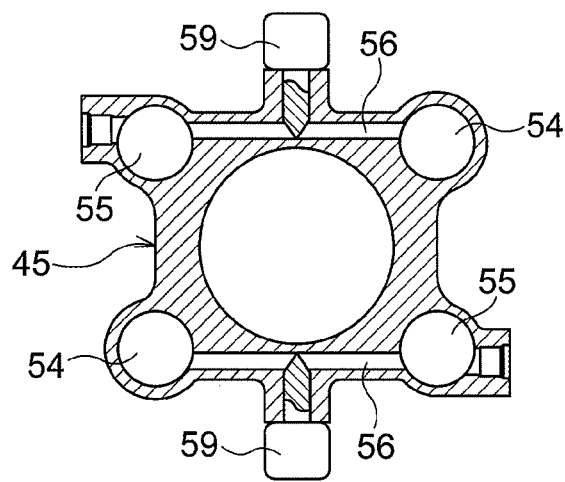
FIG. 11 is a plan view in horizontal section showing the base member.

As shown in FIG. 11, at a vertically intermediate position of the base member 45, a communication oil passage 56 is formed integrally in the base member 45 for communicating the oil chamber 54 provided inside the cylinder tube 47 of the upper hydraulic cylinder 44a and the oil chamber 55 provided inside the cylinder tube 49 of the lower hydraulic cylinder 44b. At a passage intermediate portion of the communication oil passage 56, there is incorporated an electromagnetic operation type opening/closing valve 59.

From the shortest state provided by contractions of all of the four hydraulic cylinders 44 as shown in FIG. 9, the communication oil passage 56 is shut by switching the opening/closing valve 59 to its closed state, and then the work oil is fed from the work oil feed opening 58 to the two upper hydraulic cylinders 44a. With this, the two upper hydraulic cylinders 44a alone will be switched over to the expanded states, whereas the two lower hydraulic cylinders 44b will be maintained under the contracted states, to thereby provide an intermediately expanded state (see FIG. 8).

Next, by opening the opening/closing valve 59 to further feed the work oil from the work oil feed opening 58, the work oil will be fed from the oil chambers 54 of the cylinder tubes 47 of the upper hydraulic cylinders 44a via the communication oil passage 56 to the oil chambers 55 of the cylinder tubes 49 of the lower hydraulic cylinders 44b. With this, there is provided the maximally expanded state in which both the two upper hydraulic cylinders 44a and the two lower hydraulic cylinders 44b are switched over to the expanded states (see FIG. 7). This operational mode in which the mode is switched over from the shortest state via the intermediately expanded state to the maximally expanded state is the sequential operation mode. Therefore, in this sequential operation mode, the ground clearance (vehicle height) of the traveling vehicle body 1 can be switched over in three steps of: the low position (shortest state), the intermediate position (intermediately expanded state) and the high position (maximally expanded state).

As shown in FIG. 9, with switchover from the shortest state in which all of the four hydraulic cylinders 44 are contracted, if the opening/closing valve 59 is switched to the opened state to feed the work oil from the work oil feed opening 58 to the two upper hydraulic cylinders 44a, the work oil will be fed via the inner oil passage 57 and the communication oil passage 56, whereby both the two upper hydraulic cylinders 44a and the two lower hydraulic cylinders 44b will be simultaneously rendered to the expanded states, whereby the mode is switched to the maximally expanded state (see FIG. 7). This operation mode from the shortest state to the maximally expanded state is the simultaneous operation mode. Therefore, in this simultaneous operation mode, the ground clearance (vehicle height) of the traveling vehicle body 1 can be switched in two steps of: the low position (shortest state) and the high position (maximally expanded state).

Though not shown, the switchover between the sequential operation mode and the simultaneous operation mode can be effected by a mode switching tool provided in the driving section 6 and a vehicle height changing operation can be effected by a vehicle height changing tool also provided in the driving section 6. The unillustrated control device will control the operations for switching the oil pressure control valve and the opening/closing valve 59 to the corresponding states, responsive to operations of the mode switching tool and the vehicle height changing tool. Incidentally, the arrangement is not limited to the arrangement having both the sequential operation mode and the simultaneous operation mode respectively, but may be an arrangement having only one of them.

As shown in FIG. 3, there is provided a stroke sensor 60 (an example of "operation amount detecting means") located on the inner side in the vehicle body lateral width direction of the vertically oriented transmission case 19 and extending vertically long the extending direction of the vertically oriented transmission case 19. The stroke sensor 60 is provided between the upper connection body 23, and a support bracket 61 provided at a lower part of the wheel support case 24.

Figure 12:
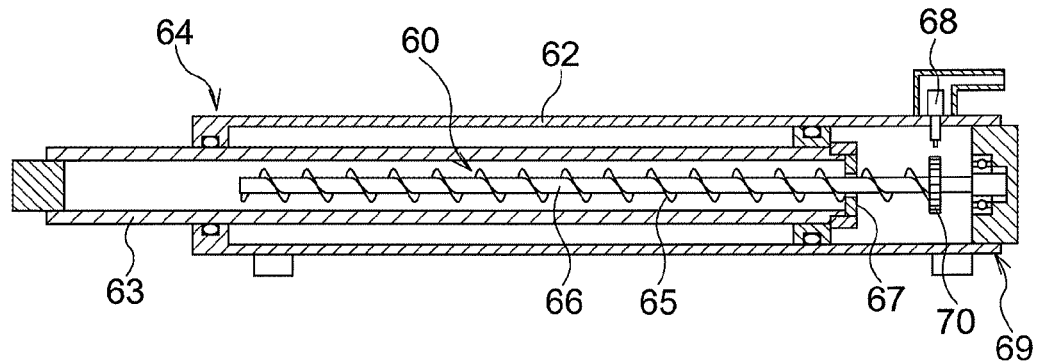
FIG. 12 is a view in section showing an arrangement of a stroke sensor.

As shown in FIG. 12, there are provided an outer tube 62 (an example of a "first member") which is relatively moved in association with expanding/contracting movements of the four hydraulic cylinders 44 and an inner tube 63 (an example of a "second member") which is slidably fitted within the outer tube 62. There is provided a tubular sliding member 64 having a cylinder structure forming a closed space therein, with closing of the terminal ends of the outer tube 62 and the inner tube 63 which terminal ends are exposed to the outside. In this tubular sliding member 64, the upper end portion of the outer tube 62 is coupled to the upper connection body 23 and the lower end portion of the inner tube 63 is coupled with the support bracket 61.

As shown in FIG. 12, the tubular sliding member 64 accommodates therein the stroke sensor 60. The stroke sensor 60 includes a screw shaft 66 provided in the outer tube 62 to be movable in unison therewith and having a helical blade 65 integrally fixed to its outer circumferential portion; a sliding contact member 67 provided in the inner tube 63 and configured to come into sliding contact with the helical blade 65 in association with a relative movement between the outer tube 62 and the inner tube 63 for guiding the screw shaft 66 for its rotation; and an electromagnetic type pickup sensor 68 as a "rotation detection sensor" capable of detecting a rotational count of the screw shaft 66.

The helical blade 65 may be formed integrally with the outer tube 62 or may be firstly produced separately of the outer tube 62 and then fixedly attached thereto.

The screw shaft 66 is supported by a support portion 69 provided at the upper end portion of the outer tube 62 to be movable in unison therewith along the axial direction and also pivotable in the circumferential direction. The screw shaft 66 is extended along the inside of the inner tube 63. At the upper end portion of the inner tube 63, there is provided the sliding contact member 67 fitted over the screw shaft 66 and configured to come into sliding contact with the helical blade 65. In the screw shaft 66, at a portion thereof extending more upwards than the sliding contact member 67, a detection gear 70 (i.e. gear for detection) is provided. The outer tube 62 includes the electromagnetic type pickup sensor 68 having the well-known arrangement at a portion thereof corresponding to the outer circumferential portion of the detection gear 70. Such pickup sensor 68 is widely used in agricultural machines or other devices and can detect a rotational count accurately and reliably.

When the outer tube 62 and the inner tube 63 move axially relative to each other in association with expansion/contraction operations of the four hydraulic cylinders 44, the helical blade 65 of the screw shaft 66 receives a sliding contact action of the sliding contact member 67 and the screw shaft 66 is rotated by a rotational amount corresponding to the amount of movement. The pickup sensor 68 can detect the rotational count of the screw shaft 66 based on waveform of electric current which is generated at the time of passing of a tooth of the detection gear 70 associated with rotation of the screw shaft 66. And, by counting the number of rotations of the screw shaft 66 from the start to the end of the rotation, it is possible to obtain the movement amount in the axial direction of the screw shaft 66 (the expansion/contraction operation amount in association with expansion/contraction of the four hydraulic cylinders 44).

Other Embodiments (1) In the foregoing embodiment, the vehicle height adjustment mechanism 43 is provided with the two upper hydraulic cylinders 44*a* and the two lower hydraulic cylinders 44*b*, as the plurality of hydraulic cylinders extending in the axial direction. However, the invention is not limited to this arrangement. Instead of the above, there may be provided three or more upper hydraulic cylinders 44*a* and lower hydraulic cylinders 44*b*, respectively. In this case, these hydraulic cylinders may be disposed in equal distribution in the circumferential direction. Further alternatively, there may be provided a plurality of (two or more) hydraulic cylinders vertically elongate along the axial direction. Still further alternatively of the above arrangement, the vehicle height adjustment mechanism 43 may include a single hydraulic cylinder, or may include, instead of such hydraulic cylinder(s), various kinds of expansion/contraction operation devices such as an electrically powered cylinder, a pneumatic cylinder, etc.

(2) In the foregoing embodiment, there is provided the base member 45 for supporting the plurality of hydraulic cylinders 44; and when the vertically oriented transmission case 19 is maximally expanded, the outer circumferential side of the overlap portion 50 where the outer tubular member 19A and the inner tubular member 19B are overlapped with each other is supported by this base member 45. In place of this arrangement, separately of the base member 45, there may be provided a support member dedicated for supporting the overlap portion 50 of the vertically oriented transmission case 19.

(3) In the foregoing embodiment, in the horizontally oriented transmission case 15, there is provided the support boss portion 51 for pivotally supporting the inner side of the vertically oriented transmission case 19. Instead of this arrangement, it is also possible to form the vertically oriented transmission case 19 per se with high rigidity, thus omitting the support boss portion 51.

(4) In the foregoing embodiment, at the upper end portion of the outer tube 62 of the tubular sliding member 64 which accommodates the stroke sensor 60, the support portion 69 is provided for supporting the screw shaft 66 with allowing its movement in the axial direction therewith and also allowing its pivoting in the circumferential direction. And, in the screw shaft 66, at a portion thereof extending more upwards than the sliding contact member 67, the detection gear 70 is provided. Instead of this arrangement, an arrangement as follows is also possible.

Figure 13:
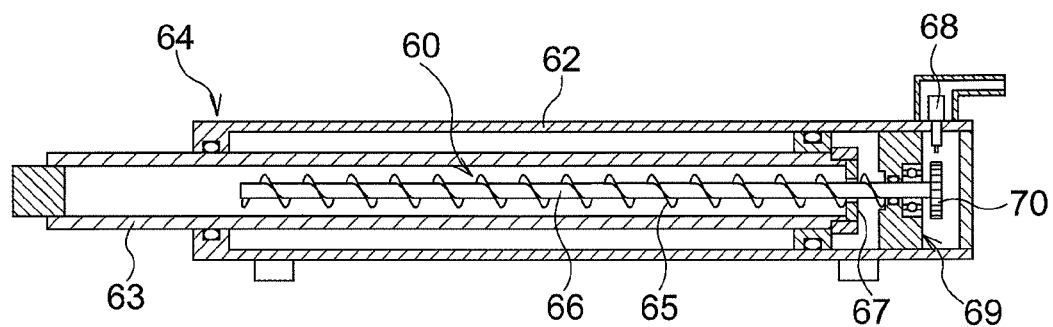
FIG. 13 is a view in section showing an arrangement of a stroke sensor according to a further embodiment.

As shown in FIG. 13, the screw shaft 66 is extended through to more outer side than the support portion 69; and at this extension portion, the detection gear 70 is provided and at the portion corresponding thereto, the pickup sensor 68 may be provided. This arrangement allows maintenance operations of the detection gear 70 and the pickup sensor 68 to be carried out easily.

(5) In the foregoing embodiment, with provision of the control device for controlling operations of the hydraulic control valve and the opening/closing valve, the stroke sensor, etc., the operation of the vehicle height adjustment mechanism 43 is controlled to carry out a vehicle height changing operation based on a detection result of the stroke sensor 60. In place of this arrangement executing such complicated control, there may be provided a simple oil pressure controlling arrangement in which with omission of the stroke sensor, the upper hydraulic cylinders 44*a* and the two lower hydraulic cylinders 44*b* are switched over between a work oil feeding state and a work oil discharging state based on a manual instruction.

(6) In the foregoing embodiment, there was disclosed an arrangement in which the vertically oriented transmission shaft 20 is provided inside the vertically oriented transmission case 19 acting as a support member and the arrangement acts as an inner and outer double structure which can be expanded/contracted with sliding movements of the vertically oriented transmission case 19 and the vertically oriented transmission shaft 20 respectively along the axis direction of the vertically oriented transmission shaft 20. In place of this arrangement, the arrangement may omit any transmission shaft inside the vertically oriented transmission case 19. Namely, in this case, the traveling wheels will freely pivot under non-driven states.

(7) In the foregoing embodiment, there was disclosed the arrangement in which the vehicle height adjustment mechanism 43 can be switched over between the sequential operation mode and the simultaneous operation mode. In place of this arrangement, it may be arranged such that only either one of the sequential operation mode and the simultaneous operation mode is performed.

(8) In the foregoing embodiment, the communication oil passages is formed to extend through the inside of the base member. In place of this arrangement, the communication oil passage may be constituted of a hose or an external pipe. Further alternatively, with omission of such communication oil passage, pipes maybe provided separately for feeding the work oil to the upper hydraulic cylinders 44a and for feeding the work oil to the lower hydraulic cylinders 44b.

(9) In the foregoing embodiment, separately of the four hydraulic cylinders 44, there is provided the tubular sliding member 64 having a cylinder structure and the operation amount detecting means (stroke sensor 60) is provided as being accommodated within this tubular sliding member 64. In place of this arrangement, the operation amount detecting means may be accommodated within the hydraulic cylinder 44.

Though not shown, in this case, the piston rod will be provided in the form of a tube, like the inner tube 63 used in the foregoing embodiment; and inside this tubular piston rod, the screw shaft 66 will be provided. On the other hand, the cylinder tube will be provided with a support portion 69 similarly to the foregoing embodiment to support the screw shaft 66 with allowing its movement therewith and allowing its rotation. And the cylinder tube will be provided with the pickup sensor 68. Therefore, the cylinder tube of the hydraulic cylinder 44 will act as the "first member" and the piston rod of the hydraulic cylinder 44 will act as the "second member". Incidentally, in the case of the arrangement including the upper hydraulic cylinders 44a and the lower hydraulic cylinders 44b like the foregoing embodiment, each hydraulic cylinder will accommodate a stroke sensor and a value which is a sum of expansion/contraction operation amounts of the upper hydraulic cylinders 44a and expansion/contraction operation amounts of the lower hydraulic cylinders 44b will be used as a total expansion/contraction operation amount.

(10) In the foregoing embodiment, the electromagnetic type pickup sensor 68 is provided as a rotation detection sensor. In place of this arrangement, other kind of rotation sensor such as a rotary encoder or the like may be used.

(11) In the foregoing embodiment, as a utility implement, the chemical spraying device 2 is provided. However, as such utility implement, other kinds of implements such as a fertilizer feeding device or the like may be provided.

INDUSTRIAL APPLICABILITY

The present invention is applicable to a riding work vehicle having a plurality of traveling wheels.

DESCRIPTION OF REFERENCE MARKS

1: traveling vehicle body
5: engine
13, 15: horizontally oriented transmission case
14, 18: horizontally oriented transmission shaft
19: support member (vertically oriented transmission case)
19A: outer tubular member
19B: inner tubular member
20: vertically oriented transmission shaft
43: vehicle height adjustment mechanism
44: hydraulic cylinder
44a: upper hydraulic cylinder
44b: lower hydraulic cylinder
45: base member
46, 48: piston rod
47, 49: cylinder tube
54, 55: oil chamber
56: communication oil passage
50: overlap portion
51: support boss portion
60: operation amount detecting means (stroke sensor)
62: first member (outer tube)
63: second member (inner tube)
64: tubular sliding member
65: helical blade
66: screw shaft
67: sliding contact member
68: rotation detection sensor (pickup sensor)
F: vehicle body frame
S: traveling wheel

What is claimed is:

1. A riding work vehicle comprising:
a traveling vehicle body;
a vehicle body frame included in the traveling vehicle body and configured to support a vehicle body side case;
a plurality of traveling wheels supported to the vehicle body frame to be changeable in direction about a rotational axis of a vertically oriented transmission shaft;
an engine provided in the traveling vehicle body for driving the respective traveling wheels with power transmitted via the vertically oriented transmission shaft;
a vertically oriented transmission case configured to cover the circumference of the vertically oriented transmission shaft;
each of the vertically oriented transmission shaft and the vertically oriented transmission case is provided as an inner/outer double structure which is expandable/contractible while sliding in a direction of an axis of the vertically oriented transmission shaft;
the vertically oriented transmission case being supported to the vehicle body side case to be pivotable together with the traveling wheels about the rotational axis of the vertically oriented transmission shaft; and
a vehicle height adjustment mechanism capable of switching a relative height of the traveling wheels relative to the vehicle body frame in a plurality of steps by expanding/contracting the vertically oriented transmission shaft and the vertically oriented transmission case in the direction of the axis of the vertically oriented transmission shaft,
wherein:
the vehicle height adjustment mechanism includes a plurality of hydraulic cylinders extending along the direction of the axis of the vertically oriented transmission shaft and a base member for supporting the plurality of hydraulic cylinders;
the vertically oriented transmission case is provided as an inner/outer double structure that can be expanded/contracted in association with mutual sliding between an inner tubular member and an outer tubular member thereof; and
when the vertically oriented transmission case is expanded maximally, an outer circumferential side of an overlap portion where the inner tubular member and the outer tubular member are overlapped with each other is supported by the base member.

2. The riding work vehicle of claim 1, wherein:
the vehicle body side case includes a support boss portion for pivotally supporting the vertically oriented transmission case; and
the support boss portion extends downwards along the direction of the axis of the vertically oriented transmission shaft on a radial inner side of the vertically oriented transmission case.

3. A riding work vehicle comprising:
a traveling vehicle body;
a vehicle body frame;
a plurality of traveling wheels; and
a tubular support member for supporting the traveling wheels to the vehicle body frame, the support member being expandable/contractible in a vertical direction;
wherein there is provided a hydraulic operation type vehicle height adjustment mechanism capable of switching, in a plurality of steps, a relative height of the traveling wheels relative to the vehicle body frame by expanding/contracting the support member;
the vehicle height adjustment mechanism includes a plurality of hydraulic cylinders that can be expanded/contracted along an expanding/contracting direction of the support member; and
the plurality of hydraulic cylinders are arranged in opposition to each other across the support member therebetween, on an outer circumferential side of the support member.

4. The riding work vehicle of claim 3, wherein:
the vehicle height adjustment mechanism includes a base member which is located at a vertically intermediate portion of the support member for supporting the plurality of hydraulic cylinders;
each said hydraulic cylinder includes an upper hydraulic cylinder expandable upwards relative to the base member and a lower hydraulic cylinder expandable downwards relative to the base member; and
the upper hydraulic cylinder and the lower hydraulic cylinder are disposed at different positions with respect to the circumferential direction of the support member.

5. The riding work vehicle of claim 4, wherein:
the vehicle height adjustment mechanism includes a communication oil passage which connects an oil chamber of the upper hydraulic cylinder to an oil chamber of the lower hydraulic cylinder;
the vehicle height adjustment mechanism is configured to be switchable between a sequential operation mode and a simultaneous operation mode;
when the communication oil passage has been switched to a closed state, the vehicle height adjustment mechanism, under the sequential operation mode, feeds work oil to the oil chamber of the upper hydraulic cylinder to expand this upper hydraulic cylinder and then switches the communication oil passage to an opened state to feed the work oil to the oil chamber of the lower hydraulic cylinder; and
when the communication oil passage has been switched to the opened state, the vehicle height adjustment mechanism, under the simultaneous operation mode, feeds the work oil simultaneously to the oil chamber of the upper hydraulic cylinder and the oil chamber of the lower hydraulic cylinder.

6. The work vehicle of claim 5, wherein the communication oil passage is formed to extend through an inside of the base member.

7. A riding work vehicle comprising:
a traveling vehicle body;
a vehicle body frame;
a traveling wheel supported to the traveling vehicle body, with relative height thereof relative to the vehicle body frame being changeable;
a hydraulic cylinder configured to be capable of switching over the relative height of the traveling wheel relative to the vehicle body frame;
an operation amount detecting device for detecting an expansion/contraction operation amount of the hydraulic cylinder; and
a first member and a second member which move relative to each other in association with expansion/contraction of the hydraulic cylinder;
wherein the operation amount detecting device includes:
a screw shaft configured to be movable together with one of the first member and the second member, the screw shaft having a helical blade on an outer circumferential portion thereof;
a sliding contact member provided in the other of the first member and the second member, the sliding contact member coming into sliding contact with the helical blade in association with relative movement between the first member and the second member, thereby rotatably guiding the screw shaft; and
a rotation detection sensor configured to be capable of detecting a rotational count of the screw shaft; and
wherein the expansion/contraction operation amount of the hydraulic cylinder is detected based on the rotational count detected by the rotation detection sensor.

8. The riding work vehicle of claim 7, wherein:
there is provided a tubular sliding member having an outer tube as the first member and an inner tube as the second member slidably engaged within the outer tube;
inside the tubular sliding member, there is formed a closed space as end portions of the outer tube and the inner tube exposed to the outside are closed; and
the operation amount detecting device is accommodated in the inside of the tubular sliding member.

9. The riding work vehicle of claim 7, wherein:
the operation amount detecting device is accommodated in an inside of the hydraulic cylinder;
a cylinder tube of the hydraulic cylinder functions as the first member; and
a piston rod of the hydraulic cylinder functions as the second member.

* * * * *